US006444906B1

(12) United States Patent
Lewis (10) Patent No.: US 6,444,906 B1
(45) Date of Patent: Sep. 3, 2002

(54) EXTERIOR WALL-MOUNTED ACCESSORY OUTLET UNIT FOR A RECREATIONAL VEHICLE, MOTOR HOME, TRAVEL TRAILER OR MOBILE HOME

(76) Inventor: Charles Marion Lewis, 14851 E. FM 1151, Amarillo, TX (US) 79118-5602

( * ) Notice: Subject to any disclaimer, the term of this patent is extended or adjusted under 35 U.S.C. 154(b) by 0 days.

(21) Appl. No.: 09/634,620

(22) Filed: Aug. 5, 2000

(51) Int. Cl.[7] .................................................. H01H 9/02
(52) U.S. Cl. ........................ 174/53; 174/55; 220/3.8; 439/535; 248/906
(58) Field of Search ............................. 174/50, 53, 66, 174/54, 60, 58, 63, 55; 220/3.2, 4.02, 3.8, 3.6, 241; 248/906; 439/535; 33/528, DIG. 10; 312/109

(56) References Cited

U.S. PATENT DOCUMENTS

| | | | | |
|---|---|---|---|---|
| 5,326,931 A | * | 7/1994 | Cain et al. | 439/535 X |
| 5,354,953 A | * | 10/1994 | Nattel et al. | 174/54 |
| 6,179,144 B1 | * | 1/2001 | Abroy et al. | 220/4.02 |
| 6,191,362 B1 | * | 2/2001 | Gretz | 174/58 |
| 6,271,467 B1 | * | 8/2001 | Book et al. | 248/906 X |
| 6,274,809 B1 | * | 8/2001 | Pudims et al. | 174/53 X |

* cited by examiner

*Primary Examiner*—Dean A. Reichard
*Assistant Examiner*—Dhiru R Patel
(74) *Attorney, Agent, or Firm*—Samuel Brown Silverman (57) ABSTRACT

The present invention, in certain embodiments, is an exterior-wall-mounted accessory outlet unit for a recreational vehicle, motor home, travel trailer or mobile home. The apparatus includes a housing and a mounting plate. The housing is adapted to be positioned through the exterior wall of a recreational vehicle, motor home, travel trailer or mobile home. The housing includes a mounting lip and side walls, which form an interior space, and a receiving ridge. The mounting plate is shaped to fit into the receiving ridge of the housing, such that the outwardly-facing planar surface is generally parallel to a plane defined by the exterior wall of a recreational vehicle, motor home, travel trailer or mobile home. Within the mounting plate is at least one aperture for accommodating at least one electrical power accessory outlet, at least one coaxial cable mount, at least one modular telephone connector and at least one exterior speaker outlet.

20 Claims, 3 Drawing Sheets

EXTERIOR WALL-MOUNTED ACCESSORY OUTLET UNIT FOR A RECREATIONAL VEHICLE, MOTOR HOME, TRAVEL TRAILER OR MOBILE HOME

FIELD OF THE INVENTION

The present invention relates to providing access to electrical power, communications, television and audio equipment in the recreational vehicle, motor home, travel trailer and mobile home construction arts, and more particularly in certain aspects, to providing access from an accessory plate parallel to, but recessed within the exterior wall of a recreational vehicle, motor home, travel trailer or mobile home.

DISCLOSURE DOCUMENT FILING REFERENCE

This invention was the subject of U.S. Patent Office Disclosure Document No. 465229, filed Nov. 18, 1999, entitled, EXTERIOR WALL-MOUNTED ACCESSORY OUTLET UNIT FOR A RECREATIONAL VEHICLE.

BACKGROUND OF THE INVENTION

The present invention relates to providing access to electrical power, communications, audio equipment, and television cable access in the exterior wall of a recreational vehicle, motor home, travel trailer or mobile home, and more particularly in certain aspects to providing user access to such services from a panel mounted within a separate openable and flush-mounted cavity.

Many people who travel with a recreational vehicle or "fifth-wheel " type of trailer do so with all of the comforts of home. In particular, it is common for people to travel with televisions and portable stereo systems as well as telephones, but usually these are located within the recreational vehicle, motor home, travel trailer or mobile home. When setting up the RV or trailer for private enjoyment or entertain under an extensible awning or tent nearby, it is frequently not possible to entertain inside the RV or trailer, but it is desirable to have a television, stereo or other source of entertainment, as well as a telephone and access to electrical power outside of the vehicle. Occupants and users of the modem recreational vehicle, travel trailer or mobile home generally desire and may require access to electrical power, communications, audio equipment, and television cable access, in various combinations, outside. Services in certain prior art systems are usually provided only within the interior of the recreational vehicle, travel trailer or mobile home, thus requiring that outside access be accomplished with extension cords.

Three problems which frequently arise pertain to: (1) the lack of electrical connections to which appliances and conveniences may be connected; (2) the lack of ready access for the electrical, audio, television, and telephone connections which may not have been originally provided for; and, (3) the expense involved and the lack of safety in having numerous electrical lines, cables and extension cords running from inside the vehicle or mobile home to the exterior to operate the desired appliances and conveniences to be connected.

In certain prior art, the basic design criteria for recreational vehicles and mobile homes does not include bringing many conventionally indoor conveniences and appliances outdoors. However, as users' tastes have evolved, many people enjoy being able to listen to music, watch television, have ready access to a telephone and electrical power, or entertain outside of the recreational vehicle or trailer. While equipped with many comforts and conveniences, most recreational vehicles, trailers and mobile homes are very compact and allocate space, especially for passage, very carefully. It is unsafe to have cords, cables and wires running along the floor where people walk, as these create safety hazards; however, because access to various electrical connections are limited, many users do not have a way to safely run wires and cables to the outdoors. Until this invention, there was no comparable cost-effective means to permit an operator to access either additional electrical accessory outlets, or to access the television antenna or satellite dish or to extend safely speaker cords, or to access directly a telephone line from the exterior of a recreational vehicle, travel trailer, or mobile home.

DESCRIPTION OF RELATED ART

External access to the power of a mobile home or travel trailer has been limited in certain prior art systems to providing access to an extension cord. Two now-expired U.S. Pat. Nos. 3,811,004 and 3,966,073, each relate to an access hatch mountable, specifically, into the side of a mobile home or travel trailer for providing access to a single electrical power supply cord. In each patent, the opening or aperture at the back of the recessed housing is large enough to allow the easily movable passage of the plug, socket, or extension cord of an electrical power line, the plug or socket portion resting in the cavity of the hatch for connection to an external electrical power source.

The art relating to gaining access to electrical power, telephone lines and other electrical connections through a flush-mounted cavity containing a variety of fixed outlets relates to building construction. U.S. Pat. No. 5,467,565 discloses a method and apparatus for creating flush concrete-slab-floor-mounted boxes to provide access to electrical power, communications and computer data services in an office building environment. There is no teaching or suggestion for applying this method or process in the context of the floor or wall of mobile home or travel trailer, as the patent teaches specifically for use in the construction of slab concrete floors of office buildings.

SUMMARY OF THE INVENTION

This invention in at least certain embodiments is directed to an improved apparatus for providing an in-wall access to connections for a variety of communication an entertainment equipment that is disposed in a recess within the exterior wall of a recreational vehicle, travel trailer or mobile home. The invention overcomes the disadvantages and shortcomings of the prior art described above.

The apparatus in at least certain embodiments of the present invention includes a housing that defines an interior volume within the exterior wall of a mobile home wall. Within this volume and resting in a receiving ridge of the interior walls is a mounting plate for receiving accessory outlets and mounting hardware and shields for separating the accessory outlets. The housing is positioned on or in the exterior wall of the recreational vehicle, motor home, travel trailer or mobile home. The housing has spaced-apart walls. Each of these walls has an exterior edge that conforms to the cavity through the exterior wall of the recreational vehicle, motor home, travel trailer, or mobile home. The side walls are joined so as to circumscribe an interior space.

The side walls extend inwardly and generally perpendicular to the plane of the exterior wall of the recreational vehicle, mobile home, motor home, or travel trailer. The housing also has an opening bounded by a mounting lip that overlies the upper edges of the side walls and defines an opening. This opening is sized to permit the facile introduction of connectors, extension cords, and other electrical connections into the accessory outlets mounted on the mounting plate. An openable and securely closable door covers the opening and mounting plate.

Accordingly, it is an object of the present invention to provide an in-wall access that permits a number of connections to services, appliances and conveniences.

It is a further object of the present invention to provide access that permits a larger number of connections to services and appliances than are provided conventionally.

These and other objects and advantages of the present invention, as well as details of certain preferred embodiments thereof will be more fully understood from the following description and the drawings.

This invention in at least certain embodiments is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in another embodiment, is an exterior wall-mounted accessory outlet unit for a recreational vehicle, motor home, travel trailer or mobile home with an exterior wall, which includes: (1) a housing, adapted to be positioned upon an exterior surface of the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inwardfacing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in another embodiment, is an exterior wall-mounted accessory outlet unit for a recreational vehicle, motor home, travel trailer or mobile home with an exterior wall, which includes: (1) a housing, adapted to be positioned upon the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) an openable and closable door mounted to the exterior of the housing.

This invention, in another embodiment, is an exterior wall-mounted accessory outlet unit for a recreational vehicle, motor home, travel trailer or mobile home with an exterior wall, which includes: (1) a housing, adapted to be positioned upon the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) an openable and closable door mounted to the exterior of the housing, which openable and closable door has a key locking mechanism for selectively locking the openable and closable door.

This invention, in another embodiment, is an exterior wall-mounted accessory outlet unit for a recreational vehicle, motor home, travel trailer or mobile home with an exterior wall, which includes: (1) a housing, adapted to be positioned upon the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) an openable and closable door mounted to the exterior of the housing, which the openable and closable door has a latch mechanism for selectively latching the openable and closable door.

This invention, in another embodiment, is an exterior wall-mounted accessory outlet unit for a recreational vehicle, motor home, travel trailer or mobile home with an exterior wall, which includes: (1) a housing, adapted to be positioned upon the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) an openable and closable door mounted to the exterior of the housing, which openable door covers the outwardly-facing planar surface of the mounting plate.

This invention, in another embodiment, is an exterior wall-mounted accessory outlet unit for a recreational vehicle, motor home, travel trailer or mobile home with an exterior wall, which includes: (1) a housing, adapted to be positioned upon the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface, an exterior channel for receiving at least a portion of the sealable periphery of the openable door, and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home;

and, (3) an openable and closable door mounted to the exterior of the housing, which openable and closable door has a sealable periphery.

This invention, in another embodiment, is an exterior wall-mounted accessory outlet unit for a recreational vehicle, motor home, travel trailer or mobile home with an exterior wall, which includes: (1) a housing, adapted to be positioned upon the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface, an exterior channel for receiving the sealable periphery of the openable door, and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) an openable and closable door which is mounted to the exterior of the housing, and which openable and closable door has a sealable periphery and is hingedly connected to the exterior of the mounting lip by a hinge mechanism.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet wherein the at least one accessory outlet in the at least one aperture in the mounting plate is at least one electrical power accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet wherein the at least one accessory outlet in the at least one aperture in the mounting plate is at least one coaxial cable mount, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet wherein the at least one accessory outlet in the at least one aperture in the mounting plate is at least one modular telephone connector, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet wherein the at least one accessory outlet in the at least one aperture in the mounting plate is at least one exterior speaker outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) means for permitting the attachment of the housing to the exterior wall of the recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) the means for permitting the attachment of the housing to the exterior wall of the recreational vehicle, motor home, travel trailer or mobile home having at least one mounting screw extending through at least one aperture in the mounting lip of the housing and attaching to the exterior wall of the recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, made of an electrically non-conductive material and adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, made of an electrically non-conductive material and shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, made of plastic and adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; and, (2) a mounting plate, made of plastic and shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip, and a sealing means between the planar underside of the mounting lip of the housing and the exterior wall of the recreational vehicle, motor home, travel trailer or mobile home; and, (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home.

This invention, in at least certain embodiments, is an exterior wall-mounted accessory outlet unit for a recreational vehicle, motor home, travel trailer or mobile home with an exterior wall. In one aspect, such an apparatus includes: (1) a housing, adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip; (2) a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls and the outwardly-facing planar surface faces is generally parallel to a plane defined by the exterior wall of a recreational vehicle, motor home, travel trailer or mobile home; and, (3) at least one removable and replaceable outlet cover to cover the at least one accessory outlet in the at least one aperture in the mounting plate.

This invention, in at least certain embodiments, is an exterior wall-mounted accessory outlet unit for a recreational vehicle, motor home, travel trailer or mobile home with an exterior wall. In one aspect, such an apparatus includes: (1) a housing, made of an electrically non-conductive material and adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surface of each of the side walls face inward and define a first space, and the top edge of each of the side walls is joined and forms a first plane, and the receiving ridge on each of the side walls forms a second plane, and having a mounting lip with an exterior surface, an exterior channel for receiving a sealable periphery of an openable and closable door, and a planar underside, for positioning upon the exterior wall of the recreational vehicle, motor home, travel trailer or mobile home, such that the top edge of each side wall, and the first plane formed thereby is fixably joined to the planar underside of the mounting lip, and a sealing means between the planar underside of the mounting lip of the housing and the exterior wall of the recreational vehicle, motor home, travel trailer or mobile home; (2) a mounting plate, made of an electrically non-conductive material, and shaped to fit within the second plane formed by the receiving ridge on each of the side walls, with an outwardly-facing planar surface, an inward-facing surface, at least one aperture in the mounting plate for receiving at least one accessory outlet wherein the at least one accessory outlet in the at least one aperture in the mounting plate is at least one electrical power accessory outlet, and wherein the at least one accessory outlet in the at least one aperture in the mounting plate is at least one coaxial cable mount, and wherein the at least one accessory outlet in the at least one aperture in the mounting plate is at least one modular telephone connector, and wherein the at least one accessory outlet in the at least one aperture in the mounting plate is at least one exterior speaker outlet, and a peripheral edge, so that the peripheral edge of the mounting plate is affixed to the receiving ridge of the inward-facing surface of each of the side walls of the housing, such that the inward-facing surface encloses one end of the first space defined by the series of inward-facing surfaces of each of the side walls, and the outwardly-facing planar surface faces is generally parallel to a plane defined by the exterior wall of a recreational vehicle, motor home, travel trailer or mobile home; (3) at least one removable and replaceable outlet cover to cover the at least one accessory outlet in the at least one aperture in the mounting plate; (4) an openable and closable door, with a locking means and a sealable periphery, mounted to the exterior of the housing to cover the outwardly-facing planar surface of the mounting plate, and attached to the exterior of the mounting lip by a hinge mechanism; and, (5) a means for permitting the attachment of the housing to the exterior wall of the recreational vehicle, motor home, travel trailer or mobile home having at least one mounting screw extending through at least one aperture in the mounting lip of the housing, and attaching to the exterior wall of the recreational vehicle, motor home, travel trailer or mobile home.

DESCRIPTION OF CERTAIN PREFERRED EMBODIMENTS

As shown in the drawings, this invention, in certain aspects, employs a housing (10) with a mounting lip (11). The housing (10) is positioned to intrude through an opening on an exterior wall (25) of a recreational vehicle, motor home, travel trailer or mobile home. The housing (10) consists of side walls (40), such that each of the side walls (40) has a top edge (60), two side edges (61), and an inward-facing surface (43). The side walls (40) define an interior volume within the exterior wall (25). On the inward-facing surfaces (43) is a receiving ridge (44), which receiving ridge is planar and parallel to the top edge of the side walls (40).

Figure 1:
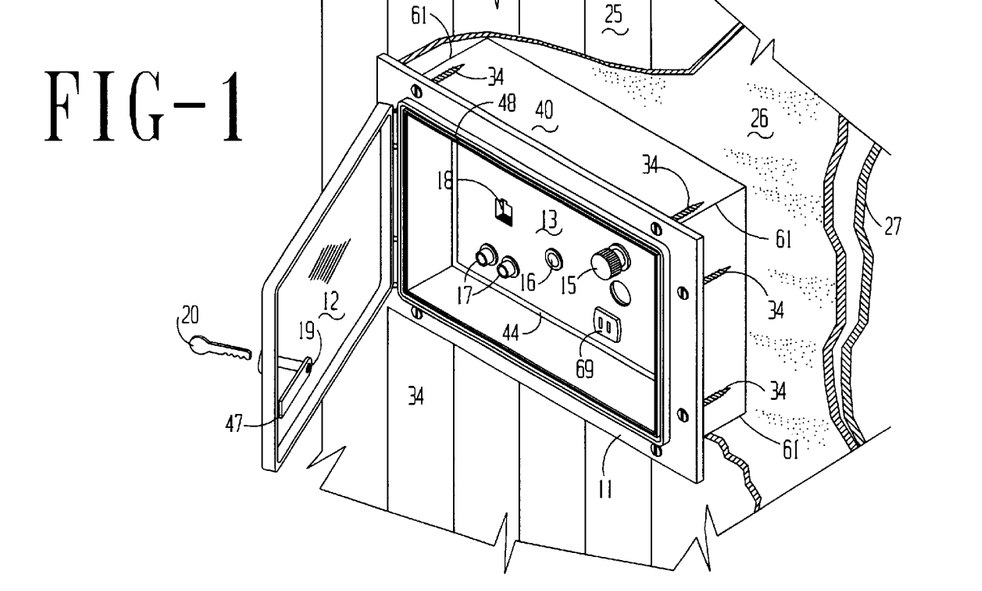
FIG. 1 is an isometric drawing of the invention mounted on the side of a travel trailer with a cut-away view showing the relationship of the elements of the invention.
Figure 2:
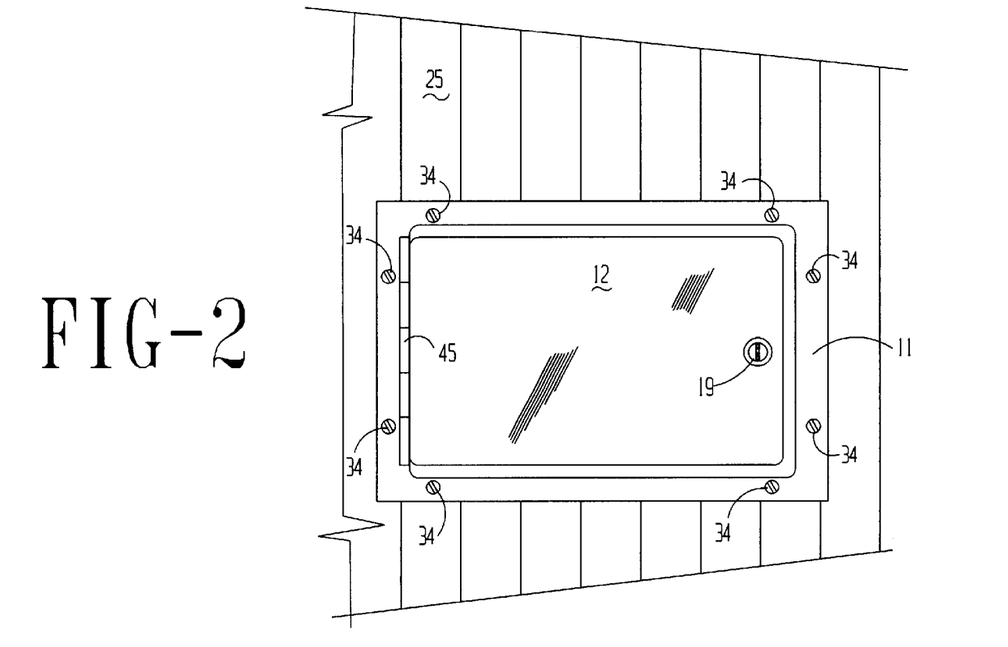
FIG. 2 is a front view of the invention with the hatch door closed over the housing.
Figure 3:
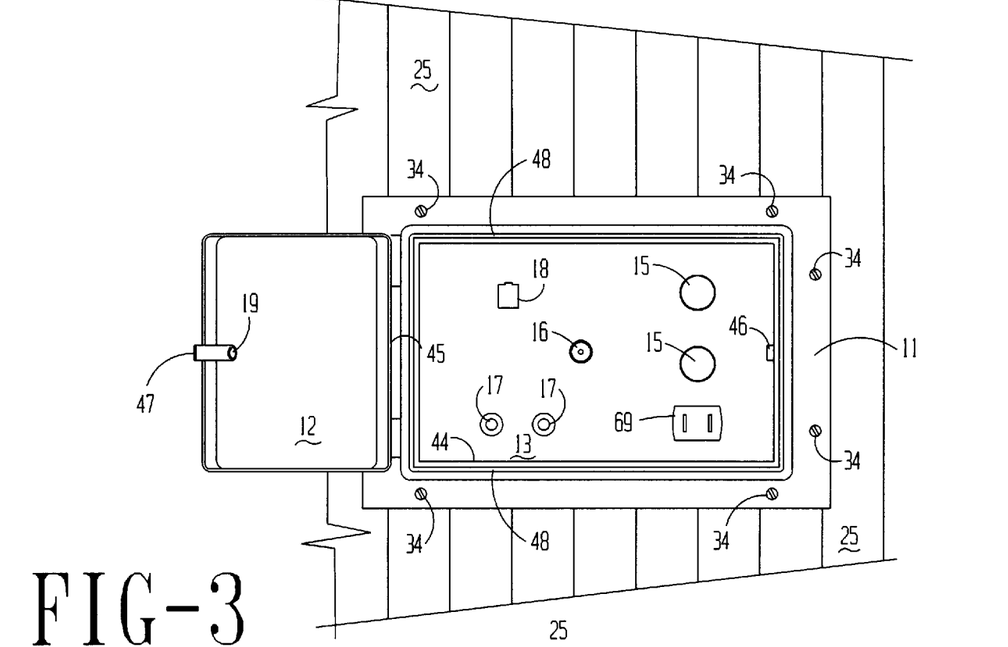
FIG. 3 is a front view of the invention with the hatch open.
Figure 6:
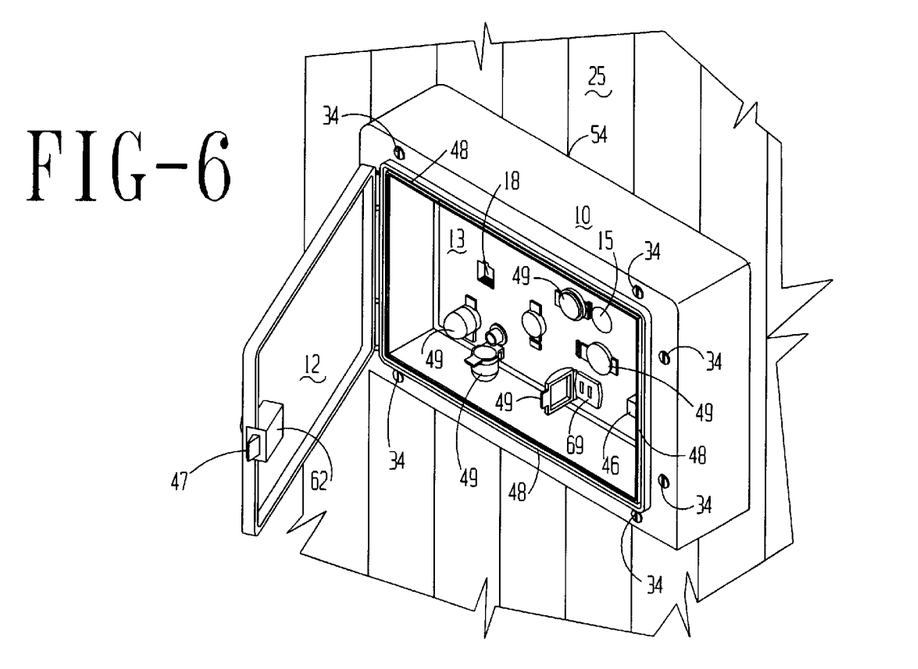
FIG. 6 shows an alternative embodiment of the invention mounted to the exterior wall of a recreational vehicle, motor home, travel trailer or mobile home.

The mounting lip (11) is located on the top of the housing (10). The top edges of the side walls (40) of the housing (10) are attached to the underside of the mounting lip (11). The underside of the mounting lip (11) is planar for mounting upon the exterior wall (25). In one preferred embodiment, on the upper side of the mounting lip (11) is located a hinge mechanism (45) for attaching an openable and closable door (12). On the upper side of the mounting lip (11) but on the side opposite the location the hinge mechanism (45) is a receiving element (46) for receiving the securing element (47) of either a locking mechanism (19), as shown in FIG. 1 and FIG. 3, or a latch mechanism (62), as shown in FIG. 6. Furthermore, on the top side of the mounting lip (11) and circumscribing the space bounded, on the top by the mounting lip (11) that overlies each top edge (60) of the side walls (40), on the sides by the side walls (40) between the receiving ridge (44) and the mounting lip (11), and on the base by the outwardly-facing planar surface of the mounting plate (13), is an optional exterior channel (48) for receiving the sealable periphery of the openable and closable door (12).

The mounting lip (11) is for mounting the apparatus upon the exterior wall (25). In one preferred embodiment, the mounting lip (11) is attached to the exterior wall (25) by at least one mounting screw (34). Each of the at least one mounting screws extends through each of the at least one apertures (35) in the mounting lip (11) of the housing (10) to the exterior wall (25). In alternative embodiments, the attachment means may include nails, glue or clips.

A mounting plate (13), which is flat and with a shape configured to be located in the plane of the receiving ridge (44) of the housing (10), is attached at its edges to the receiving ridge (44) on the interior walls (14) of the housing (10). The plane of the mounting plate (11) is, preferably, parallel to the plane of the exterior wall (25). The mounting plate (11) has one or more apertures for accommodating accessory outlets.

Figure 4:
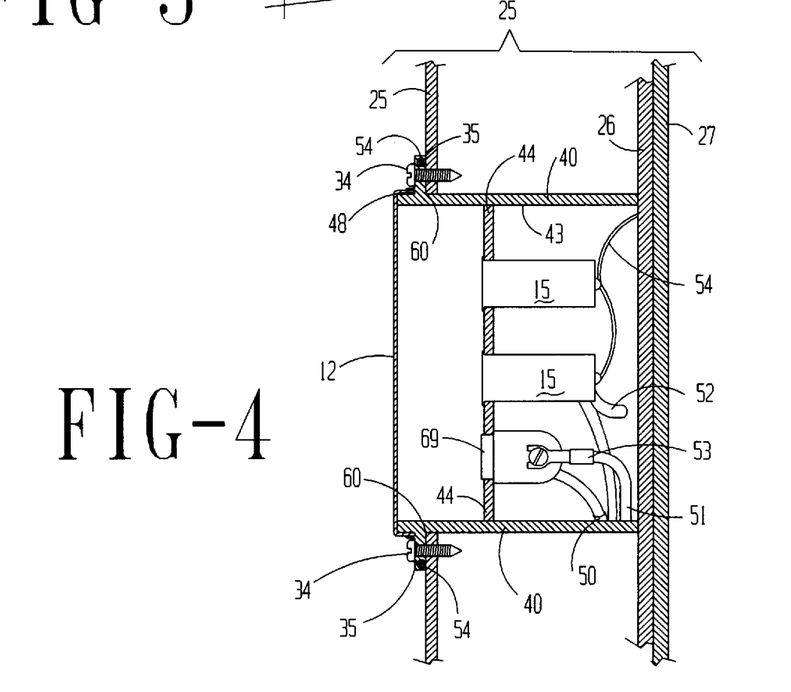
FIG. 4 is a section drawing showing the cross-section of the invention, as seen from the side.
Figure 5:
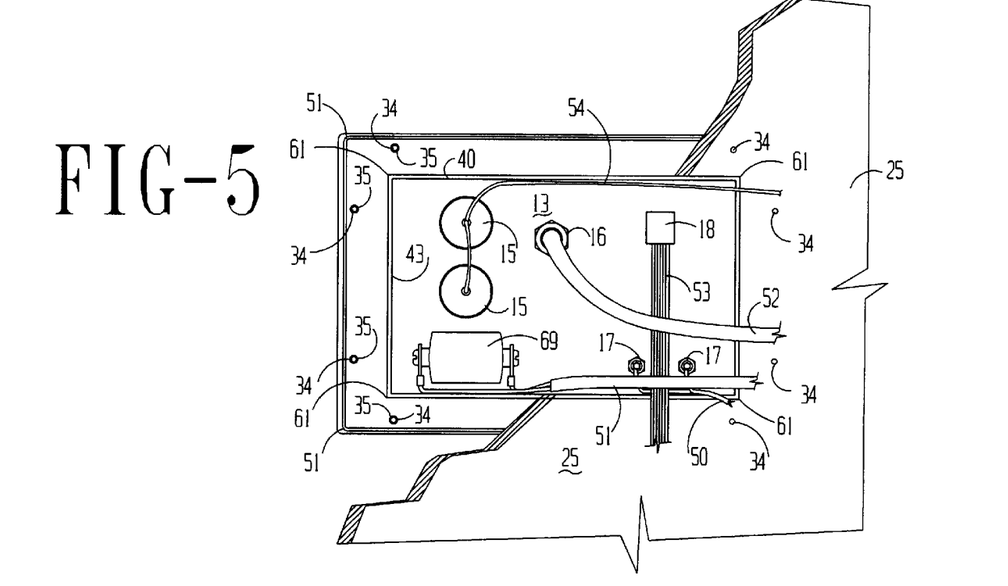
FIG. 5 shows the rear view of the invention and how the various outlets are mounted to the mounting plate.

One or more accessory outlets are mounted on and through the mounting plate (13). The accessory outlets may be a variety of accessory outlets, which, as shown in the drawings, may be one or more, or a combination of one or more twelve-volt accessory outlets (15) or other type of electrical outlet (69), a threaded coaxial cable mount (16) to accommodate a television antenna cable, exterior speaker outlets (17), or a modular telephone connection (18). These accessory outlets are connected to the services or appliances in the recreational vehicle, motor home, travel trailer or motor home by electrical cables or wires, each of which run inside the exterior wall (25) to the back of the housing. As best shown in FIGS. 4 & 5, accessory wires (50) from a stereo or other audio system, a coaxial cable or wire (52) from a television antenna, cable television connection, video player or recorder, a telephone cable (53) or bundle of wires for a telephone, a twelve volt electrical supply wire (54), or a 110 volt electrical supply cable (51) are connected to the corresponding accessory outlet in the mounting plate (11).

An openable and securably closable door (12) is, optionally, mounted on the exterior of the housing to one side of the mounting lip (11). The openable and closable door (12) prevents damage to the mounting plate (11) and accessory outlets either from the elements or intentional or unintentional tampering. In one preferred embodiment, the door covers a space bounded on the top by the mounting lip (11) that overlies the top edges of the side walls, on the sides by the side walls between the receiving ridge and the mounting lip, and on the base by the outwardly-facing planar surface of the mounting plate (13).

The openable and closable door (12) has, optionally, a sealable periphery and the mounting lip (11) has an exterior channel (48) for receiving the sealable periphery of the closable door (12). Additionally, the openable and closable door (12) is attached to the exterior of the mounting lip (11) by a hinge mechanism (45). The first side of the hinge mechanism (45) is attached to the mounting lip (11), while the second side of the hinge mechanism (45) is affixed to the side of the openable and closable door (12) opposite the locking mechanism (19) or alternative latch mechanism. In the preferred embodiment, the door is held securably closed by a locking mechanism (19) which is operated by a key (20). However, in another embodiment, the door is held securably closed by a non-locking latch mechanism.

In an alternative embodiment, and as is shown in FIG. 6, this invention may employ a removable and replaceable outlet cover (49) to cover an accessory outlet. For those accessory outlets that are used infrequently or are especially sensitive to fouling by the elements, an individual cover or cap may be used to protect an accessory outlet. The individual cover or cap may be used either in lieu of or in addition to the protection afforded by the openable and closable door (12).

In one preferred embodiment, the housing (10) is made from a electrically nonconductive material, which in this embodiment, is plastic. The housing (10), inclusive of the lip (11), has overall dimensions of seven and one-half inches (7½") wide, six and one-half inches (6½") in height and one and three-quarters inches (1¾") in depth. The dimensions of the housing (10) without the lip (11) are approximately, five and three-quarter inches (5¾") wide, four and one-half inches (4½") in height and one and three-quarters inches (1¾") in depth. The depth of the housing (10) corresponds with the depth of the wall (25) of a recreational vehicle from the exterior wall portion (25) to the foamboard (26) immediately behind the interior wall (27) of the recreational vehicle, motor home, travel trailer or mobile home. As a security device, because the housing (10) and door (12) components resemble a standard filler hatch, the apparatus does not betray the existence of corresponding the entertainment equipment within the vehicle.

One preferred embodiment is flush-mounted in a cavity in the exterior wall (25) of a recreational vehicle, motor home, travel trailer or mobile home. So mounted, the housing (10) is recessed with the exterior wall (25) and the mounting lip (11) and the door (12) are exposed. In the preferred embodiment, a sealing means (54) forms a watertight seal between the planar underside of the mounting lip (11) of the housing (10) and the exterior wall (25). In an alternative embodiment, as shown in FIG. 6, the housing (10) is not recessed, but is mounted upon the exterior surface of the exterior wall (25).

I claim:

1. An exterior wall-mounted accessory outlet unit for a recreational vehicle, motor home, travel trailer or mobile home with an exterior wall, comprising:

a housing adapted to be positioned through the exterior wall of a recreational vehicle, motor home, travel trailer or mobile home, and having side walls, each of the side walls having a top edge, two side edges, and an inward-facing surface with a receiving ridge parallel to the top edge of the respective each of the side walls, and such that the side edges of each of the side walls are spaced apart and are fixably joined in series such that the inward-facing surfaces of each of the side walls face inward and define a first space and the top edge of each of the side walls is joined and forms a first plane and the receiving ridge on each of the side walls forms a second plane, and having a mounting lip with an exterior surface and a planar underside, for positioning upon the exterior wall of the recreational vehicle, motor home, travel trailer or mobile home, such that the top edge of each side wall, and the first plane formed thereby is fixably joined to the planar underside of the mounting lip, and a mounting plate, shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that the inward-facing surface encloses one end of the first space defined by a series of the inward-facing surfaces of each of the side walls and the outwardly-facing planar surface is generally parallel to a plane defined by the exterior wall of a recreational vehicle, motor home, travel trailer or mobile home.

2. An exterior wall-mounted accessory outlet unit for a recreational vehicle, motor home, travel trailer or mobile home with an exterior wall as recited in claim 1, wherein the housing is adapted to be positioned upon an exterior surface of the exterior wall of a recreational vehicle, motor home, travel trailer or mobile home.

3. An exterior wall-mounted accessory outlet unit for a recreational vehicle, motor home, travel trailer or mobile home with an exterior wall as recited in claim 1, further comprising an openable and closable door mounted to the exterior of the housing.

4. An exterior wall-mounted accessory outlet unit for a recreational vehicle, motor home, travel trailer or mobile home with an exterior wall as recited in claim 3, further comprising a key-locking mechanism for selectively locking the openable and closable door.

5. An exterior wall-mounted accessory outlet unit for a recreational vehicle, motor home, travel trailer or mobile home with an exterior wall as recited in claim 3, further comprising a latch mechanism for selectively latching the openable and closable door.

6. An exterior wall-mounted accessory outlet unit for a recreational vehicle, motor home, travel trailer or mobile home with an exterior wall as recited in claim 3, wherein the openable and closeable door covers the outwardly-facing planar surface of the mounting plate.

7. An exterior wall-mounted accessory outlet unit for a recreational vehicle, motor home, travel trailer or mobile home with an exterior wall as recited in claim 3, wherein the openable and closable door has a sealable periphery, and the mounting lip further comprises an exterior channel for receiving at least a portion of the sealable periphery of the openable and closeable door.

8. An exterior wall-mounted accessory outlet unit for a recreational vehicle, motor home, travel trailer or mobile home with an exterior wall as recited in claim 7, further comprising a hinge mechanism hingedly connecting the openable and closable door to the exterior of the mounting lip.

9. An exterior wall-mounted accessory outlet unit for a recreational vehicle, motor home, travel trailer or mobile home with an exterior wall as recited in claim 1, wherein the at least one accessory outlet in the at least one aperture in the mounting plate is at least one electrical power accessory outlet attached to the mounting plate through the at least one aperture in the mounting plate.

10. An exterior wall-mounted accessory outlet unit for a recreational vehicle, motor home, travel trailer or mobile home with an exterior wall as recited in claim 1, wherein the at least one accessory outlet in the at least one aperture in the mounting plate is at least one coaxial cable mount attached to the mounting plate through the at least one aperture in the mounting plate.

11. An exterior wall-mounted accessory outlet unit for a recreational vehicle, motor home, travel trailer or mobile home with an exterior wall as recited in claim 1, wherein the at least one accessory outlet in the at least one aperture in the mounting plate is at least one modular telephone connector attached to the mounting plate through the at least one aperture in the mounting plate.

12. An exterior wall-mounted accessory outlet unit for a recreational vehicle, motor home, travel trailer or mobile home with an exterior wall as recited in claim 1, wherein the at least one accessory outlet in the at least one aperture in the mounting plate is at least one exterior speaker outlet attached to the mounting plate through the at least one aperture in the mounting plate.

13. An exterior wall-mounted accessory outlet unit for a recreational vehicle, motor home, travel trailer or mobile home with an exterior wall as recited in claim 1, further comprising means for permitting the attachment of the housing to the exterior wall of the recreational vehicle, motor home, travel trailer or mobile home.

14. An exterior wall-mounted accessory outlet unit for a recreational vehicle, motor home, travel trailer or mobile home with an exterior wall as recited in claim 13, wherein the means for permitting the attachment of the housing to the exterior wall of the recreational vehicle, motor home, travel trailer or mobile home comprises at least one mounting screw which extends through at least one aperture in the mounting lip of the housing, and attaches to the exterior wall of the recreational vehicle, motor home, travel trailer or mobile home.

15. An exterior wall-mounted accessory outlet unit for a recreational vehicle, motor home, travel trailer or mobile home with an exterior wall as recited in claim 1, wherein the housing is made of an electrically non-conductive material.

16. An exterior wall-mounted accessory outlet unit for a recreational vehicle, motor home, travel trailer or mobile home with an exterior wall as recited in claim 1, wherein the mounting plate is made of an electrically non-conductive material.

17. An exterior wall-mounted accessory outlet unit for a recreational vehicle, motor home, travel trailer or mobile home with an exterior wall as recited in claim 1, wherein the housing and mounting plate are made of plastic.

18. An exterior wall-mounted accessory outlet unit for a recreational vehicle, motor home, travel trailer or mobile home with an exterior wall as recited in claim 1, further comprising
- a sealing means between the planar underside of the mounting lip of the housing and the exterior wall of the recreational vehicle, motor home, travel trailer or mobile home.

19. An exterior wall-mounted accessory outlet unit for a recreational vehicle, motor home, travel trailer or mobile home with an exterior wall as recited in claim 1, further comprising
- at least one removable and replaceable outlet cover to cover the at least one accessory outlet in the at least one aperture in the mounting plate.

20. An exterior wall-mounted accessory outlet unit for a recreational vehicle, motor home, travel trailer or mobile home with an exterior wall, comprising:
- a housing,
  - made of an electrically non-conductive material and adapted to be positioned through the exterior wall of a recreational vehicle, motor home, travel trailer or mobile home, and
  - having side walls, each of the side walls having a top edge, two side edges, and an inward-facing surface with a receiving ridge parallel to the top edge of the respective each of the side walls, and such that the side edges of each of the side walls are spaced apart and are fixably joined in series such that
    - the inward-facing surfaces of each of the side walls face inward and define a first space, and
    - the top edge of each of the side walls is joined and forms a first plane, and
    - the receiving ridge on each of the side walls forms a second plane, and
  - having a mounting lip with an exterior surface, an exterior channel for receiving a sealable periphery of an openable and closable door, and a planar underside,
    - for positioning upon the exterior wall of the recreational vehicle, motor home, travel trailer or mobile home, such that the top edge of each side wall, and the first plane formed thereby is fixably joined to the planar underside of the mounting lip, and
  - a sealing means between the planar underside of the mounting lip of the housing and the exterior wall of the recreational vehicle, motor home, travel trailer or mobile home, and
- a mounting plate,
  - made of an electrically non-conductive material, and shaped to fit within the second plane formed by the receiving ridge on each of the side walls, with an outwardly-facing planar surface, an inward-facing surface, at least one aperture in the mounting plate for receiving at least one accessory outlet, and a peripheral edge, so that the peripheral edge of the mounting plate is affixed to the receiving ridge of the inward-facing surface of each of the side walls of the housing, such that
    - the inward-facing surface encloses one end of the first space defined by a series of each inward-facing surface of each of the side walls, and
    - the outwardly-facing planar surface faces is generally parallel to a plane defined by the exterior wall of a recreational vehicle, motor home, travel trailer or mobile home, and
    - the at least one accessory outlet in the at least one aperture in the mounting plate is at least one electrical power accessory outlet, and
    - the at least one accessory outlet in the at least one aperture in the mounting plate is at least one coaxial cable mount, and
    - the at least one accessory outlet in the at least one aperture in the mounting plate is at least one modular telephone connector, and the at least one accessory outlet in the at least one aperture in the mounting plate is at least one electrical power accessory outlet, and
- at least one removable and replaceable outlet cover to cover the at least one aperture in the mounting plate, and
- an openable and closable door,
  - with a locking means and a sealable periphery, mounted to the exterior of the housing to cover the outwardly-facing planar surface of the mounting plate, and
  - attached to the exterior of the mounting lip by a hinge mechanism, and means for permitting the attachment of the housing to the exterior wall of the recreational vehicle, motor home, travel trailer or mobile home comprising at least one mounting screw extending through at least one aperture in the mounting lip of the housing, and attaching to the exterior wall of the recreational vehicle, motor home, travel trailer or mobile home.

* * * * *